United States Patent
Hayashi et al.

(10) Patent No.: US 8,411,545 B2
(45) Date of Patent: Apr. 2, 2013

(54) RECORDING APPARATUS, MASTER MANUFACTURING APPARATUS, AND METHOD OF MANUFACTURING AN OPTICAL DISC RECORDING MEDIUM

(75) Inventors: Shinobu Hayashi, Shizuoka (JP); Akiya Saito, Kanagawa (JP)

(73) Assignees: Sony Corporation (JP); Sony DADC Corporation (JP)

( * ) Notice: Subject to any disclaimer, the term of this patent is extended or adjusted under 35 U.S.C. 154(b) by 0 days.

(21) Appl. No.: 13/367,568

(22) Filed: Feb. 7, 2012

(65) Prior Publication Data
US 2012/0207006 A1  Aug. 16, 2012

(30) Foreign Application Priority Data
Feb. 15, 2011 (JP) ................. P2011-029661

(51) Int. Cl.
*G11B 7/00* (2006.01)

(52) U.S. Cl. ................. 369/59.12; 369/59.14

(58) Field of Classification Search .......... 369/59.1, 369/59.11, 59.12, 59.14, 275.3
See application file for complete search history.

(56) References Cited

U.S. PATENT DOCUMENTS
2006/0140094 A1 * 6/2006 Tabata et al. ........... 369/59.1

FOREIGN PATENT DOCUMENTS
JP  2009-070458 A  4/2009

* cited by examiner

*Primary Examiner* — Nabil Hindi
(74) *Attorney, Agent, or Firm* — Lerner, David, Littenberg, Krumholz & Mentlik, LLP

(57) ABSTRACT

A recording apparatus includes a rotation driving portion that rotates and drives an optical disc master; and a recording portion that performs an information recording on the optical disc master, by performing a laser beam irradiation on the optical disc master, based on a recording waveform which has a land pulse of a first power, a recording waveform portion having a recording pulse of a second power higher than the first power, and a cooling pulse which has a third power lower than the first power and is inserted between the land pulse and the recording waveform portion.

6 Claims, 6 Drawing Sheets

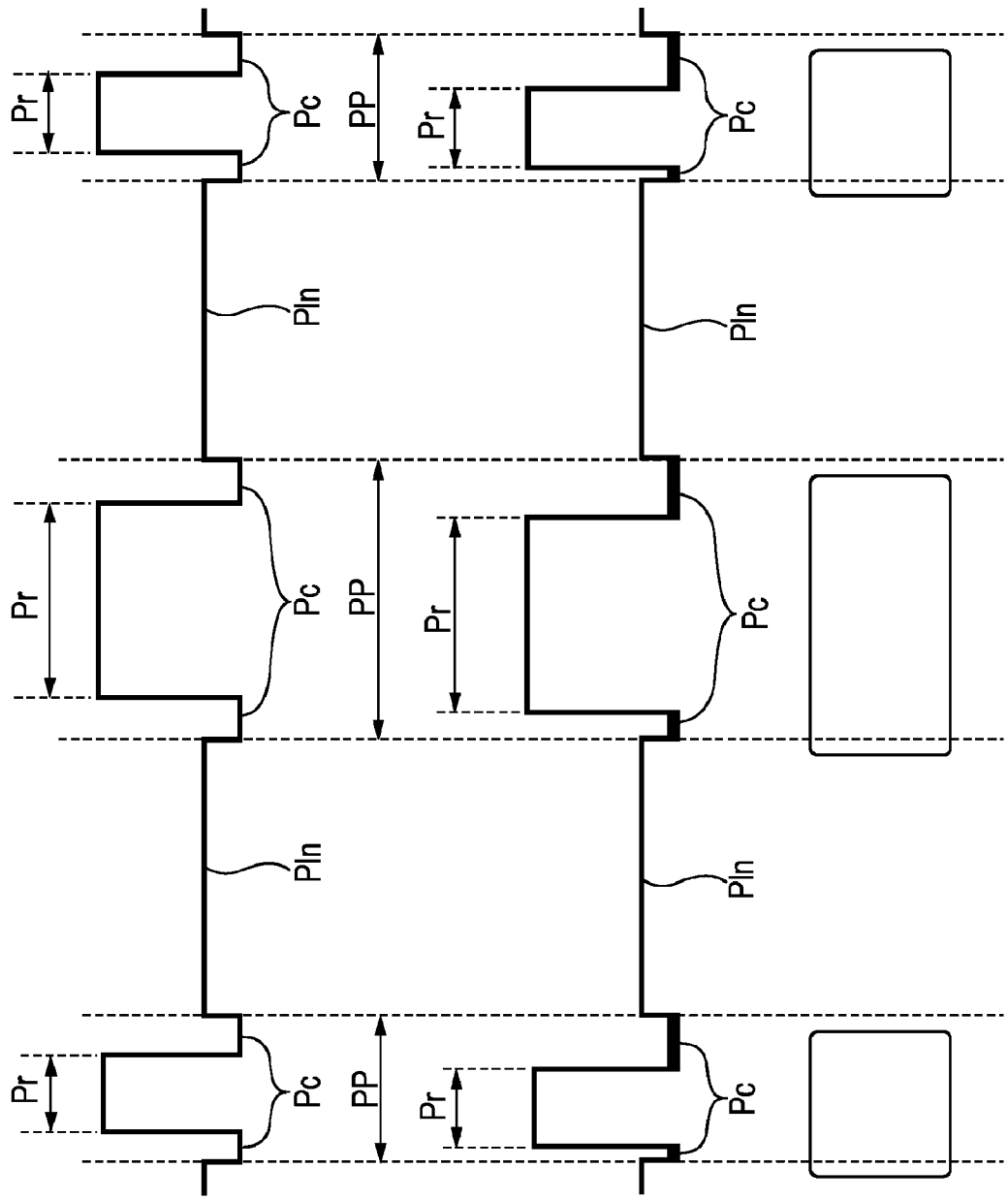

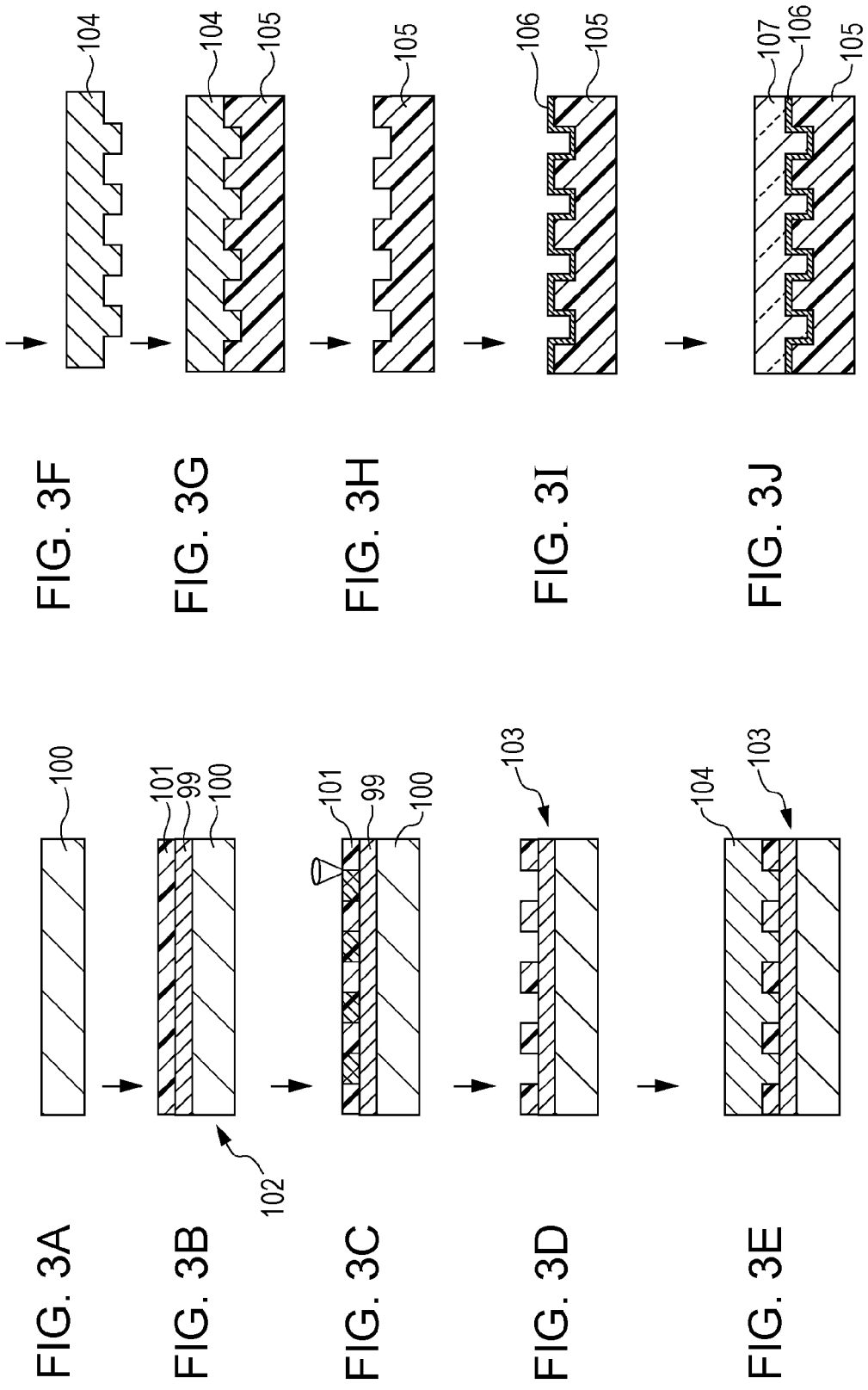

RECORDING APPARATUS, MASTER MANUFACTURING APPARATUS, AND METHOD OF MANUFACTURING AN OPTICAL DISC RECORDING MEDIUM

CROSS-REFERENCE TO RELATED APPLICATION

The present application claims priority from Japanese Patent Application No. JP 2011-029661 filed in the Japanese Patent Office on Feb. 15, 2011, the entire content of which is incorporated herein by reference.

BACKGROUND

The present disclosure relates to a recording apparatus that performs recording (light exposure) to an optical disc master, a master manufacturing apparatus for applying a development process on the exposed optical disc master to create a recorded master, and an optical disc recording medium manufacturing method for manufacturing an optical disc recording medium onto which recording information (a concave and convex pattern) is transferred based on the recorded master.

Japanese Unexamined Patent Application Publication No. 2009-70458 is an example of the related art.

For example, in an optical disc recording medium such as a CD (Compact Disc), a DVD (Digital Versatile Disc), or a BD (Blu-ray Disc: registered trademark), as is known as a so-called ROM type, there is a medium on which information is recorded by a combination of pits and lands. That is, information is recorded by formation of patterns of a concave portion as a pit and a convex portion as a land.

In manufacturing of the optical disc recording medium of the ROM type, firstly, a laser beam irradiation is performed on an optical disc master formed with a photosensitive layer to perform the information recording. Moreover, the development processing is performed on the optical disc master subjected to the recording process to create the recorded master formed with the pits, a stamper is created onto which the pit pattern (and recording information) formed on the recorded master is transferred, then, a substrate is created in which the recording information is reproduced by injection molding using the stamper or the like, and the film formation of a reflective film or the like is performed on the substrate, thereby manufacturing the optical disc recording medium.

In the manufacturing process of the optical disc recording medium, in recent years, a PTM (Phase Transition Mastering) type has been adopted in the recording process (a mastering process) so as to respond to a high recording density of the optical disc recording medium. The type is a so-called thermal recording.

In the PTM type, an inorganic resist is used as a photoresist that constitutes the photosensitive layer. Furthermore, a semiconductor laser is used as a recording laser.

Herein, in a type of the related art that does not adopt the PTM type, a gas laser or the like is irradiated by the use of an organic resist as the photosensitive layer. In this case, since the light exposure of the photoresist is a so-called optical recording, a portion exposed by laser becomes the pit as is. That is, the laser spot diameter directly affects the pit width as is.

On the contrary, in the PTM type, since heat is given due to the irradiation of laser beams, the characteristics of the inorganic resist are changed (that is, a chemical property is changed) and a recording mark is formed. In an inorganic resist used in the PTM type, a considerable chemical property change is indicated in a portion where heat is concentrated, and the size of a groove to be formed does not directly depend on the laser spot diameter. That is, in this respect, the PTM type is able to perform a groove formation that is finer than the type of the related art.

In the mastering of the PTM type, a recording waveform is used which takes into account the characteristic of the thermal recording.

FIG. 6A shows an example of a recording waveform corresponding to the thermal recording.

The recording waveform of this case includes a land pulse Pln, a recording waveform portion Pr, and a cooling pulse Pc that is inserted between the land pulse Pln and the recording waveform portion Pr as shown in the drawing.

The recording waveform portion Pr is a waveform portion that has a pulse of high power for forming the pit by the thermal recording. In addition, FIG. 6A shows that the recording waveform portion Pr has a single pulse and a constant power, but, in fact, for example, it is necessary that the recording waveform portion Pr is constituted by a more complex pulse depending on the pit length to be recorded.

The land pulse Pln is a pulse for forming the land portion, and is a pulse for adjusting the overall quantity of heat for assisting the thermal recording of the pit portion. The power may be at least set to be lower than the power at which the pit is formed.

In this case, it is characteristic that the cooling pulse Pc is inserted between the recording waveform portion Pr and the land pulse Pln. In the cooling pulse Pc, as the power thereof, power lower than that of the land pulse Pln is set. By the insertion of the cooling pulse Pc, it is possible to obtain an effect of increasing the contrast of the pit/land boundary in both of a front side edge and a back side edge of the pit formed on the optical disc master.

Furthermore, according to the recording waveform shown in FIG. 6A, by obtaining the land pulse Pln of a power higher than that of the cooling pulse Pc, it is possible to obtain an effect of suppressing an occurrence of a lack of heat due to the insertion of the cooling pulse Pc, particularly, at the front edge side, as a so-called preheat effect.

SUMMARY

Herein, in the recording process (a cutting process) on the optical disc master, an increase in speed thereof is desirable to improve efficiency in production or the like.

However, in the case of using the recording waveform in which the cooling pulse Pc as above is inserted, it was found that, when gradually increasing the speed of the cutting, there is a problem in that the pit deformation occurs or jitter worsens.

FIG. 6B schematically shows an appearance of the pit that is formed when increasing the cutting speed (the recording speed) from a normal speed by the use of the recording waveform shown in FIG. 6A. In addition, FIG. 6B only focuses on the pit marked with an oblique line in the middle of the page.

In regard to the front edge side of the pit, unlike the back edge side of the pit, the front portion thereof is a land portion (that is, the laser irradiation of high power is not performed). For this reason, there is a tendency towards the problem of a lack of heat being easily generated at the front edge side of the pit, and due to this, a front edge position is shifted backward as shown in FIG. 6B along with the increase in speed or the thinning of the front portion is generated. The problem of a lack of heat is more likely to occur when a land length between the front edge and the front pit is long or a size (T length: T is a channel bit) of the front pit is small.

Meanwhile, at the back edge side, laser of high power is irradiated until just before the land pulse Pin intended for the preheat effect in the land portion is applied, whereby there is a tendency for heat accumulation throughout to be easily generated. For this reason, particularly, when the gap between the back edge and the back pit is close or the back pit length is long, heat accumulation throughout is easily generated due to an increase in speed, and due to this, there is a problem in that the back edge is shifted backward or the pit back portion spreads.

It is desirable to suppress the deformation of the pit or an accompanying deterioration due to jitter as mentioned above that is generated when increasing the recording speed, in a case of performing the mastering by a so-called thermal recording.

According to an embodiment of the present disclosure, a recording apparatus has a configuration as below.

That is, the recording apparatus includes a rotation driving portion that rotates and drives an optical disc master.

Furthermore, the recording apparatus includes a recording portion that performs an information recording on the optical disc master, by performing a laser beam irradiation on the optical disc master, based on a recording waveform which has a land pulse of a first power, a recording waveform portion having a recording pulse of a second power higher than the first power, and a cooling pulse which has a third power lower than the first power and is inserted between the land pulse and the recording waveform portion, wherein when performing the recording on the optical disc master at a second speed higher than a first speed, compared to a case of performing the recording at the first speed, the recording portion does not change the length of a waveform portion including the recording waveform portion and the cooling pulse placed at both ends of the recording waveform portion and the length of the land pulse, reduces the length of the cooling pulse of a front side of the cooling pulse and expands the length of the cooling pulse of a back side thereof, thereby performing the recording on the optical disc master.

An optical disc recording medium manufacturing method for manufacturing an optical disc recording medium on which information is recorded by a concave and convex pattern is as below.

That is, the method includes a master creating process of forming a photosensitive layer, which senses light by a thermal reaction due to the laser beam irradiation, on an upper layer of a substrate to create an optical disc master.

Furthermore, the method further includes a recording process of performing an information recording on the optical disc master, by performing a laser beam irradiation on the optical disc master that is rotated and driven, based on a recording waveform which has a land pulse of a first power, a recording waveform portion having a recording pulse of a second power higher than the first power, and a cooling pulse which has a third power lower than the first power and is inserted between the land pulse and the recording waveform portion, wherein when performing the recording on the optical disc master at a second speed higher than a first speed, compared to a case of performing the recording at the first speed, the recording process does not change the length of a waveform portion including the recording waveform portion and the cooling pulse placed at both ends of the recording waveform portion and the length of the land pulse, reduces the length of the pulse of a front side of the cooling pulse and expands the length of the pulse of a back side thereof, thereby performing the recording on the optical disc master.

Furthermore, the method further includes a recorded master creating process of developing the optical disc master recorded by the recording process to create the recorded master formed with a concave and convex pattern on the photosensitive layer.

Furthermore, the method further includes a stamper creating process of creating a stamper onto which the concave and convex pattern formed on the photosensitive layer is transferred, based on the recorded master.

Furthermore, the method further includes a medium creating process of creating the optical disc recording medium by the use of the stamper created by the stamper creating process.

As described above, in the present disclosure, when performing the recording on the optical disc master by the second speed higher than the first speed, the length of the cooling pulse of the front side of the cooling pulse is reduced and the length of the cooling pulse of the back side thereof is expanded.

If the cooling pulse length of the front side is reduced, since the gap between the recording waveform portion and the land pulse of the front side thereof is shortened accordingly, it is possible to improve the lack of heat of the pit front side. That is, as a result, it is possible to suppress the thinning of the front portion of the pit or the backward shift of the front edge position.

Furthermore, if the cooling pulse length of the back side is expanded, it is possible to ensure a long cooling period in the pit back accordingly, whereby it is possible to effectively suppress the heat accumulation throughout due to an increase in recording speed. As a result, it is possible to suppress an excessive growth of the pit back side.

As a consequence, it is possible to effectively suppress the deformation of the pit or worsening of jitter due to an increase in recording speed.

According to the present disclosure, in the case of performing the mastering by a so-called thermal recording, it is possible to suppress the deformation of the pit generated when increasing the recording speed or the accompanying worsening of jitter.

BRIEF DESCRIPTION OF THE DRAWINGS

FIGS. 1A to 1C are diagrams for describing a recording method according to an embodiment of the present disclosure;

FIGS. 3A to 3J are schematic diagrams for describing an optical disc recording medium manufacturing method of an embodiment of the present disclosure;

DETAILED DESCRIPTION OF EMBODIMENTS

Hereinafter, best modes (hereinafter, referred to as embodiments) for carrying out the present disclosure will be sequentially described.

1. Recording Method of Embodiment
2. Disk Manufacturing Process
3. Configuration of Master Manufacturing Apparatus
4. Configuration of Original Record Recording Portion
5. Modified Example

1. Recording Method of Embodiment

FIGS. 1A to 1C are diagrams for describing a recording method of an embodiment.

FIG. 1A shows a recording waveform corresponding to a recording time by a normal recording speed, and FIG. 1B shows a recording waveform corresponding to a recording time (hereinafter, referred to as a high-speed recording) at the recording speed higher than the normal recording speed.

Firstly, in the present embodiment, a recording waveform is also used which has a land pulse Pln, a recording waveform portion Pr, and a cooling pulse Pc inserted between the land pulse Pln and the recording waveform portion Pr as shown in FIGS. 1A to 1C so as to respond to the recording (the thermal recording) by a PTM (Phase Transition Mastering) Method.

The recording waveform portion Pr is a waveform portion that has a pulse (the recording pulse) of high power for forming the pit by the thermal recording.

In addition, like FIGS. 6A and 6B, FIGS. 1A to 1C also show that the recording waveform portion Pr has a single pulse and constant power, but, actually, for example, it is necessary that the recording waveform portion Pr be constituted by a complicated pulse depending on the pit length to be recorded or the like.

The land pulse Pln is a pulse for forming the land portion and for adjusting an overall amount of heat for assisting the thermal recording of the pit portion, and the power thereof is set to be at least lower than the power at which the pit is formed. The power of the land pulse Pln is set within the scope, in which the pit is not formed, to suitable power so that a so-called preheat effect can effectively be obtained.

Figures 6A, 6B:
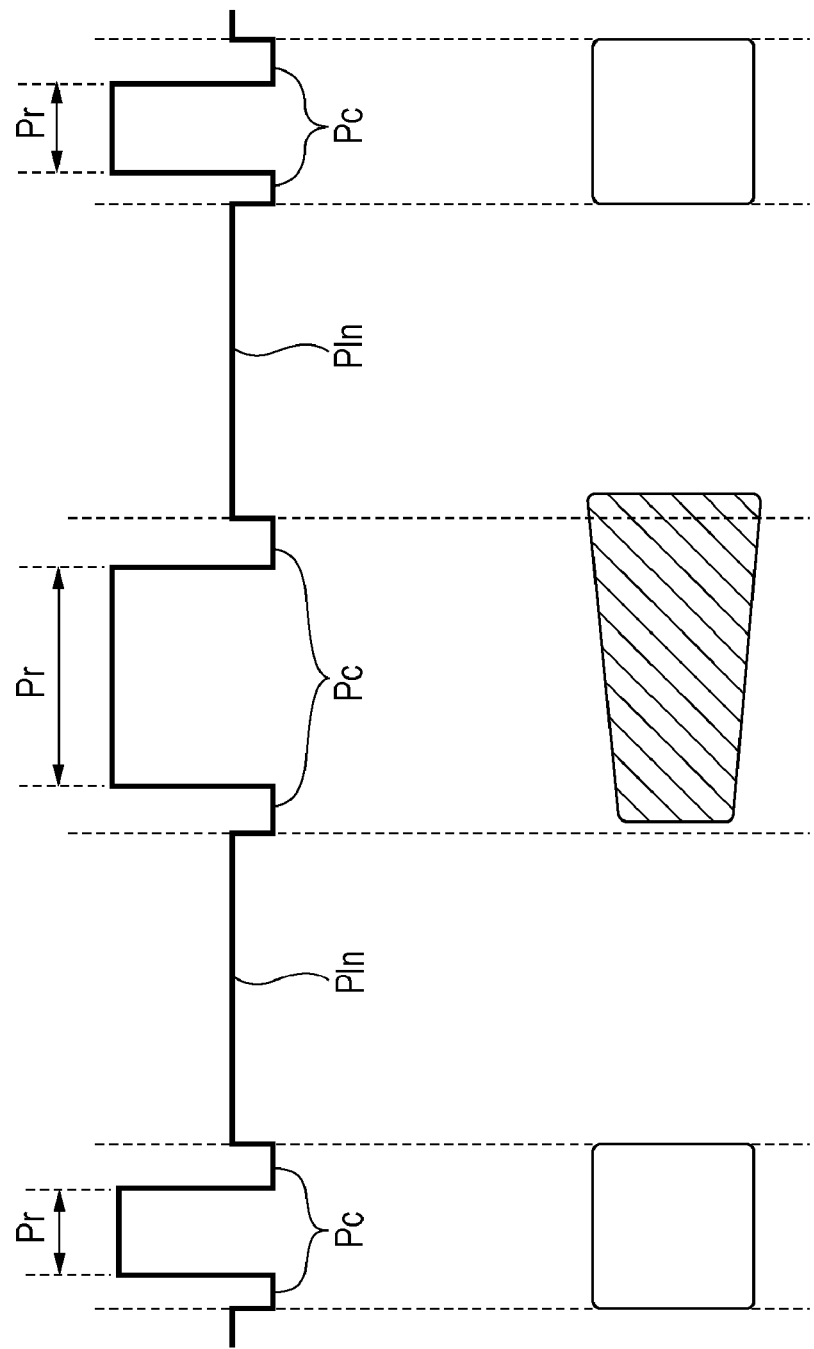
FIGS. 6A and 6B are diagrams that describe a recording waveform of the related art and the problem thereof.

Like the case of FIGS. 6A and 6B, the cooling pulse Pc is set so as to have power lower than that of the land pulse Pln. By the insertion of the cooling pulse Pc, it is possible to obtain an effect of increasing the contrast of the pit/land boundary at both of the front edge and the back edge of the pit that is formed on the optical disc master.

Furthermore, as mentioned above, a power higher than that of the cooling pulse Pc is set as the power of the land pulse Pln, whereby it is possible to promote a suppression of a lack of heat due to the insertion of the cooling pulse Pc, particularly, at the front edge side, as a so-called preheat effect.

Herein, the lengths of the recording waveform portion Pr and the cooling pulse Pc are set to predetermined lengths depending on the pit length to be formed on the optical disc master. Furthermore, the length of the land pulse Pln is set depending on the land length to be formed.

As described with reference to FIGS. 6A and 6B above, in the case of increasing the recording speed further than the normal speed, when using a recording waveform (a recording waveform of the related art) of the normal speed time shown in FIG. 1A as is, there is a problem in that the pit is deformed or jitter worsens. Specifically, there is a problem in that the edge position is shifted backward or thinned due to the lack of heat in the front portion of the pit, and the backward shift of the edge position or the expansion of the width is generated due to the heat accumulation throughout the back portion.

The problem of the lack of heat of the front portion is easily generated, particularly, when the land length between the front portion and the front pit is long or the front pit length is short. Furthermore, the problem of the heat accumulation throughout of the back portion is easily generated, particularly, when the land length between the back portion and the back pit is short or the back pit length is long. That is, there is an influence due to interference between symbols.

Thus, in the present embodiment, the recording waveform shown in FIG. 1B is used depending on the case of performing the high-speed recording.

That is, as indicated by a bold line in FIG. 1B, when performing the high-speed recording, concerning the cooling pulse Pc provided at both ends of the recording waveform portion Pr, the recording waveform is adjusted so that the length of the cooling pulse Pc of the front side is shortened and the length of the cooling pulse Pc of the back side is more lengthened compared to the normal recording time.

At this time, the length (a portion indicated by a pit forming waveform portion PP in FIGS. 1A to 1C) of the waveform portion including the recording waveform portion Pr and the cooling pulses Pc placed at both ends thereof, and the length of the land pulse Pln is not changed compared to the normal recording time. In other words, a reduction amount of the pulse length of the cooling pulse Pc of the front side is identical to the expansion amount of the pulse length of the cooling pulse Pc of the back side.

In addition, as can be understood by comparing FIGS. 1A and 1B with each other, the adjustment of the cooling pulse length can be expressed such that the recording waveform portion Pr is shifted to the front side by a predetermined amount.

As mentioned above, if the length of the cooling pulse Pc of the front side of the cooling pulse Pc is shortened and the length of the cooling pulse Pc of the back side thereof is expanded, concerning the front side of the pit, the gap between the recording waveform portion Pr and the land pulse of the front side thereof is shortened, whereby it is possible to improve the lack of heat of the pit front side due to an increase in recording speed. As a consequence, it is possible to promote the suppression of the thinning of the front portion of the pit or the backward shift of the front edge position.

Furthermore, by the expansion of the cooling pulse length of the back side, the cooling period in the pit back side can be enlarged accordingly, whereby it is possible to effectively suppress heat accumulation throughout due to an increase in recording speed. That is, as a result, it is possible to suppress an excessive growth of the pit back side.

As a consequence, it is possible to effectively suppress the deformation of the pit or the worsening of jitter when performing the high-speed recording.

In addition, when the shift amount of the pulse length of the cooling pulse Pc is excessive, there is a concern that an energy leakage from the pit front side at the pit front side is great, which leads to worsening of jitter. That is, in terms of jitter improvement, the greater the shift amount is, the worse the energy leakage is.

In regard to the shift amount in view of this point, it is desirable to deduct and set an amount that is reasonable in terms of the jitter improvement effect, for example, from the result in which the test is actually performed. According to the test, for example, in the case of BD (Blu-ray Disc: registered trademark), it was found that the shift amount of about $\frac{1}{4}$ T (T is a channel clock) is optimal during recording of double speed to triple speed.

Herein, FIG. 1C schematically shows a pit row that is formed when performing the high-speed recording using the recording waveform shown in FIG. 1B, but when performing the recording by the recording waveform shown in FIG. 1B, only a phase of the pit row generally progresses, and a relative positional relationship of the pit is not different from the normal recording time.

Figures 2A, 2B:
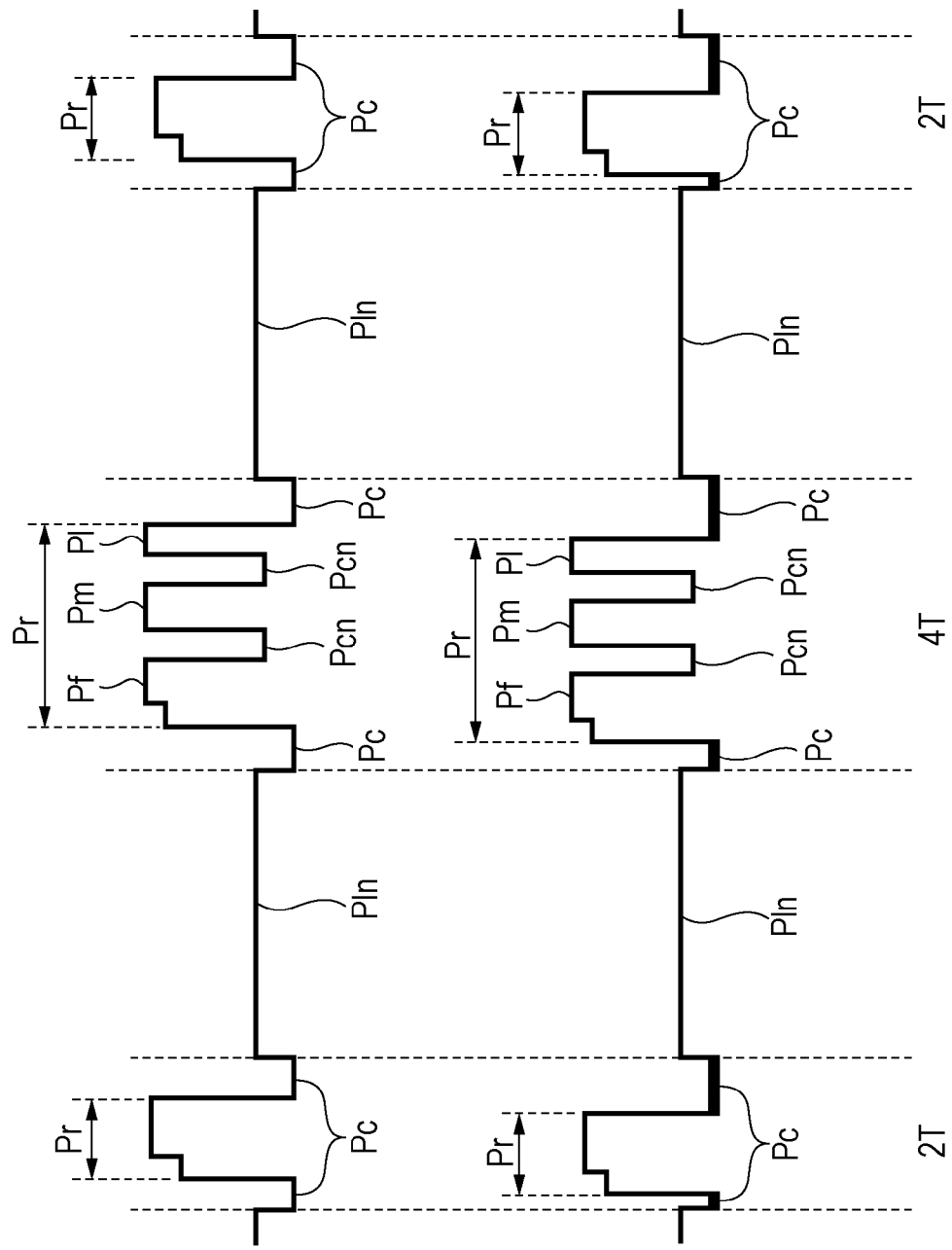
FIGS. 2A and 2B are diagrams for describing a specific pulse configuration example of a recording waveform portion.

In addition, in the description mentioned above, a specific pulse configuration of the recording waveform portion Pr is not particularly limited, but, as an example, a pulse configuration shown in FIGS. 2A and 2B is adopted.

In FIGS. 2A and 2B, FIG. 2A shows a recording waveform corresponding to the recording time by the normal speed and FIG. 2B shows a recording waveform corresponding to a high-speed recording time.

Each of FIGS. 2A and 2B shows the waveform portions corresponding to portions of 2T pit→4T land→4T pit→4T land→2T pit of the recording waveform.

In the case of the present example, the recording waveform portion Pr corresponding to 2T pit (the shortest pit length) is constituted by a single recording pulse. Furthermore, the recording waveform portion Pr of 3T pit or more is constituted by a plurality of recording pulses connected by a connection pulse Pcn. For example, in the case of 4T pit, as shown in FIGS. 2A and 2B, a configuration is adopted in which three recording pulses of a first pulse Pf, a multi pulse Pm, and a last pulse Pl are connected by the connection pulse Pcn, respectively.

The connection pulse Pcn is inserted so as to arrange (prevent a caterpillar-shaped pit) the shape of the pit, and power lower than that of the land pulse Pin and higher than that of the cooling pulse Pc is set as the power thereof.

Furthermore, although it is not shown, the recording waveform portion Pr of the 3T pit has, for example, a configuration in which two recording pulses are connected by the connection pulse Pcn. Furthermore, the recording waveform portion Pr of 5T or more may have a configuration in which the numbers of recording pulses (the multi pulse Pm) and connection pulses Pcn are gradually increased whenever the T length is increased such as 5T, 6T . . . .

Furthermore, in the present example, concerning the recording pulse of the case of 2T pit and the first pulse Pf of the case of the 3T pit or more, it is possible to adjust the power in the tip portion thereof. The fine adjustment of the front edge position of the pit can be performed by the power adjustment of the tip portion.

Herein, a test result related to jitter when performing the high-speed recording by a recording method as the embodiment described above will be described.

In the test, the recording waveform according to the configuration described in FIGS. 2A and 2B was used as the recording waveform. Furthermore, in the test, the recording by 2.5 times speed (based on the normal recording speed=1 time speed) is performed as the high-speed recording, and the shift amount of the cooling pulse Pc was set to ¼ T.

A jitter measurement of the optical disc was performed on master that is subjected to the high-speed recording by the condition mentioned above. When performing the high-speed recording according to the recording method of the present embodiment, it is possible to obtain the result in which jitter is improved by 0.3% as compared to a case of performing the high-speed recording by the waveform of the normal recording time shown in FIG. 2A.

2. Disk Manufacturing Process

Next, a manufacturing process of the optical disc recording medium as an embodiment, to which the recording method as the embodiment mentioned above is applied, will be described with reference to FIGS. 3A to 3J.

In FIGS. 3A to 3J, processes of manufacturing the optical disc recording medium can be broadly classified into a master manufacturing process, a recording process (an exposure process), a developing process, a mold (a stamper) producing process, and a recording medium creating process.

In addition, the optical disc recording medium described herein refers to a disk-shaped recording medium in which the recording information is read by an irradiation of light. Hereinafter, the optical disc recording medium is also simply written as an optical disc.

FIG. 3A shows a master forming substrate 100 constituting the optical disc master. Firstly, an inorganic resist layer 101 formed of an inorganic-based resist material by a sputtering method is uniformly formed on the master forming substrate 100 (a resist layer forming process, FIG. 3B). As a result, an inorganic resist master 102 is created first.

As mentioned above, in the present example, as a mastering process of manufacturing the optical disc master, mastering of a PTM type using the inorganic-based resist material is performed, but, in the case of the present example, as a material provided for the resister layer 101, an incomplete oxide of a transition metal is used. Specific transition metals include, for example, Ti, V, Cr, Mn, Fe, Nb, Cu, Ni, Co, Mo, Ta, W, Zr, Ru, Ag or the like.

In addition, the specific material of the resist layer 101 is not particularly limited as long as the material is capable of a so-called thermal recording (senses light by the thermal reaction due to the laser beam irradiation).

In addition, in order to improve the exposure sensitivity of the inorganic resist layer 101, a predetermined intermediate layer 99 may be formed between the substrate 100 and the resist layer 101, and FIG. 3B shows this state. In any case, the resist layer 101 may be formed so as to be exposed to the outside on an upper layer of the substrate 100 so that light can be sensed depending on the laser beam irradiation during exposure.

Furthermore, in this case, for example, a Si wafer substrate is used as the master forming substrate 100, and the film formation of the resist layer 101 is performed by sputtering. In this case, as the film forming method, a DC or RD sputter is used.

Next, a selective exposure corresponding to the signal pattern is performed on the resist layer 101 to sense light (a resist layer exposure process, FIG. 3C).

In addition, the exposure process (the recording process) is performed by the use of a master manufacturing apparatus (a master manufacturing apparatus 1) described below, but a recording operation performed by the master manufacturing apparatus 1 of the present embodiment will be described later.

Moreover, a disk master 103 (a recorded master) is created in which a predetermined concave and convex pattern is formed by developing the resist layer 101 (a resist layer developing process, FIG. 3D). In the resist layer developing process, a specific developing method includes a dipping method by an immersion or a method of applying a solution medicine to the master 102 rotated by a spinner or the like.

As a developer, for example, an organic alkaline developer, such as TMAH (tetramethylammonium hydroxide), an inorganic alkaline developer of KOH, NaOH, a phosphate-base or the like are used.

Next, after washing the disk master 103 created as mentioned above with water, a metal master is produced by an electroforming bath (an electroforming process, FIG. 3E). Moreover, after the electroforming, by peeling the disk master 103 and the metal master, a molding stamper 104 is obtained onto which the concave and convex pattern of the disk master 103 is transferred (FIG. 3F). In this case, as a material of the metal master (the stamper 104), Ni is used.

Herein, before forming the electroforming process of FIG. 3E, it is also possible that a release treatment of the surface of the disk master 103 is performed to improve release property. The treatment is performed as necessary.

An improvement in release property may be performed, for example, by performing any treatment indicated below on the disk master 103.

1) the disk master is immersed in an alkaline solution heated to 40 to 60° C. in a few minutes.

2) the disk master is subjected to an electrolytic oxidation in the state of being immersed in the electrolytic alkaline solution heated to 40 to 60° C. for a few minutes.

3) an oxide film is formed by the use of the RIE or the like.

4) a metal oxide film is formed by the use of a film forming device.

Otherwise, an improvement in release property can also be realized by selecting a material of a composition having an oxide composition ratio that is more easily released from the metal master, as the inorganic resist material in advance.

In addition, after producing the stamper 104, the disk master 103 is stored in a cleaned and dried state, and a desired number of stamper 104 is repeatedly produced as necessary.

Next, a resin disc substrate 105 made from polycarbonate which is a thermoplastic resin is molded by injection molding method by using the stamper 104 (FIG. 3G).

After that, by peeling the stamper 104 (FIG. 3H) and forming a reflective film 106 (FIG. 3I) such as Ag alloy and a protective film 107 having a film thickness of about 0.1 mm on the concave and convex surface of the resin disk substrate 105, the optical disc is created (FIG. 3J). That is, as s result, it is possible to obtain an optical disc recording medium in which information is stored by the concave and convex pattern.

3. Configuration of Master Manufacturing Apparatus

Figure 4:
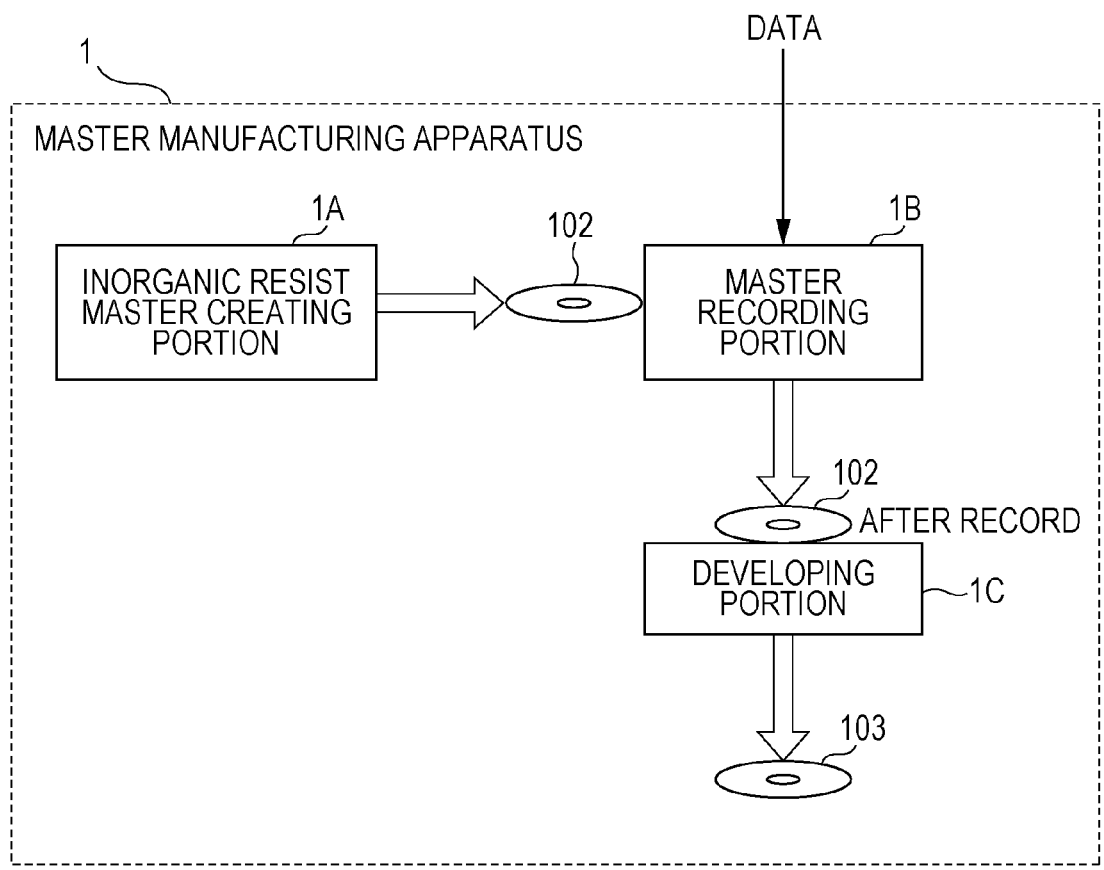
FIG. 4 is a diagram that shows an internal configuration example of a master manufacturing apparatus of an embodiment of the present disclosure.

A configuration example of the master manufacturing apparatus 1 of the present embodiment, which performs the mastering by the PTM type, is shown in FIG. 4. The master manufacturing apparatus 1 performs the formation of the recording mark on the inorganic resist master 102 formed with the inorganic resist layer 101 by the thermal recording operation through the laser beam irradiation, in the mastering process of FIGS. 3C and 3D above.

In FIG. 4, the master forming apparatus 1 includes an inorganic resist master creating portion 1A, a master recording portion 1B, and a developing portion 1C.

The inorganic resist master creating portion 1A creates the inorganic resist master 102 by the resist layer forming process shown in FIG. 3B.

For example, a Si wafer as the master forming substrate 100 is loaded to the inorganic resist master creating portion 1A from the outside, and an inorganic resist material as the resist layer 101 is formed on the wafer, for example, by sputtering.

In addition, when forming the intermediate layer 99 mentioned above, after a material as the intermediate layer 99 is formed on the master forming substrate 100, the resist layer 101 is formed on an upper layer thereof.

The inorganic resist master 102 created by the inorganic resist master creating portion 1A is moved to a master recording portion 1B. In addition, although it is not shown, the delivery of the master from the inorganic resist master creating portion 1A to the master recording portion 1B is performed by a handling robot provided in the master manufacturing apparatus 1. Furthermore, the delivery of the master 102 subjected to the recording (the exposure) by the master recording portion 1B to the developing portion 1C is also performed by the handling robot.

The master recording portion 1B performs the recording (the light exposure of the inorganic resist layer 101) by irradiating the inorganic resist master 102 with laser beam based on the input data. A laser beam is irradiated on the master 102, whereby the characteristics of the inorganic resist layer 101 formed on the master surface is changed by the heat, and the recording mark is formed.

An internal configuration of the master recording portion 1B will be described below.

The developing portion 1C performs the development processing as described in FIG. 3D on the inorganic resist master 102 in which the recording is performed by the master recording portion 1B, thereby creating the disk master 103 as the recorded master. Specifically, after immersing the inorganic resist master 102 in the developer, the same is cleaned to create the disk master 103.

By such a development processing, a groove portion (that is a pit) of a concave state is formed in the exposed portion.

4. Configuration of Original Record Recording Portion

Figure 5:
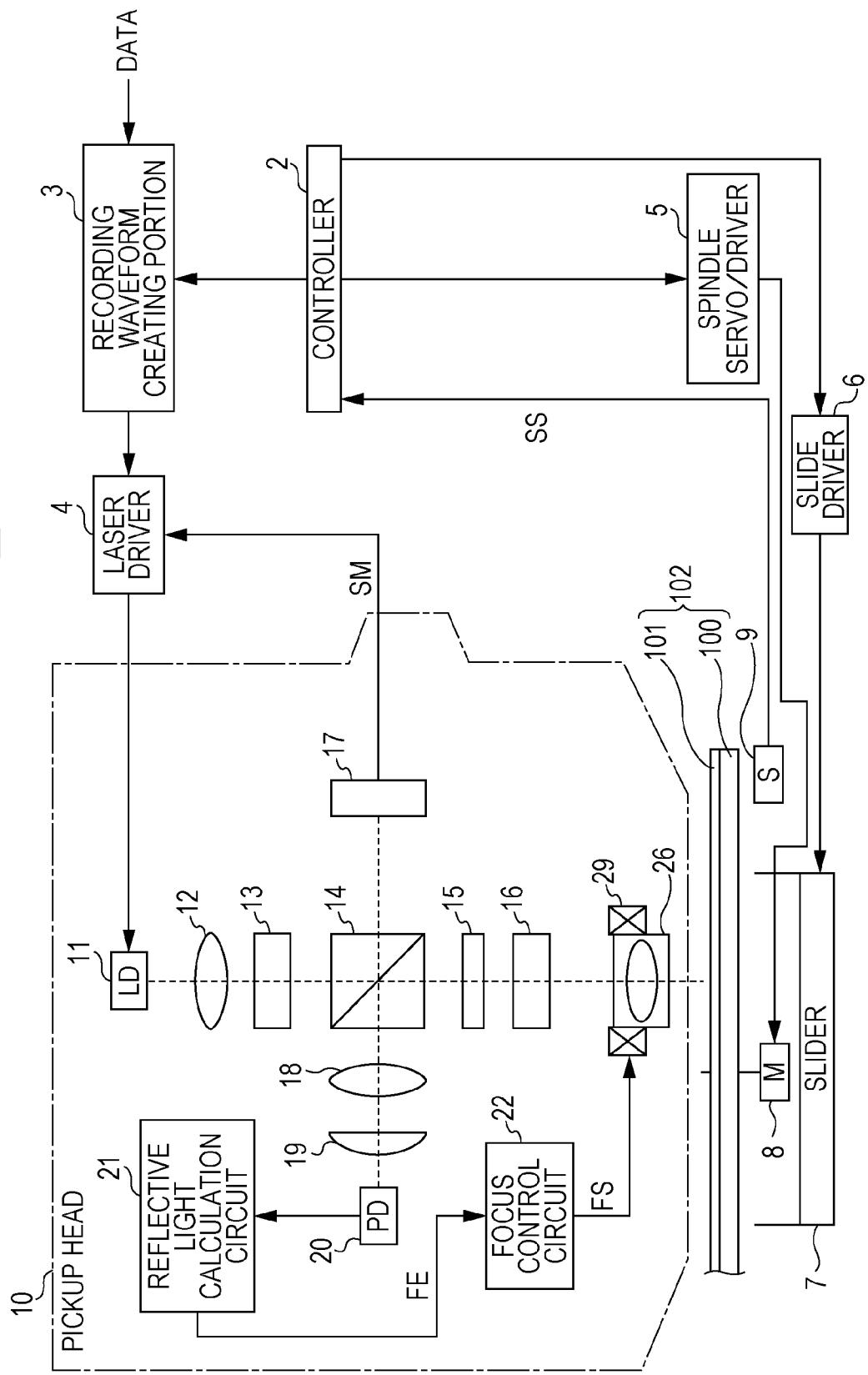
FIG. 5 is a diagram that shows an internal configuration example of a recording apparatus (a master recording portion) of an embodiment of the present disclosure.

FIG. 5 shows an internal configuration example of the master recording portion 1B (the recording apparatus of the embodiment) shown in FIG. 4.

In FIG. 5, the master recording portion 1B includes a configuration indicated by an alternate long and short dash line portion as a pickup head 10. In the pickup head 10, a wavelength depending on the type of the optical disc recording medium to be manufactured is set in a laser beam source 11 as a semiconductor laser. In the case of the present embodiment, the wavelength of about 405 nm depending on BD is set.

The laser beam emitted from the laser beam source 11 is converted to a parallel beam by a collimator lens 12, and then, the spot shape is transformed to, for example, a circular shape by an anamorphic prism 13 and is guided to a polarization beam splitter 14.

Additionally, the polarization component transmitted by the polarization beam splitter 14 is guided to an object lens 26 via a $\lambda/4$ wavelength plate 14 and a beam expander 16, is condensed by the object lens 26, and is irradiated on the inorganic resist master 102 (the master forming substrate 100 formed with the inorganic resist layer 101).

As mentioned above, laser light irradiated onto the disk master 103 via the object lens 26 is focused on the inorganic resist layer 101 in the inorganic resist layer 101. The inorganic resist master 102 absorbs the laser beam, whereby a polycrystal is generated, particularly, in a portion heated to a high temperature near the center of the irradiation portion.

By this action, the exposure pattern is gradually formed on the inorganic resist layer 101.

The laser beam reflected in the polarization beam splitter 14 is irradiated to a monitor detector 17 (a photodetector for a laser power monitor). The monitor detector 17 outputs an optical intensity monitor signal SM depending on a light sensing amount of light (optical intensity) of the laser beam.

Meanwhile, the return beam of the laser beam irradiated to the inorganic resist master 102 reaches the polarization beam splitter 14 through the object lens 26, the beam expander 16, and the $\lambda/4$ wavelength plate 14. In this case, a polarization plane is rotated by 90° by passing through the $\lambda/4$ wavelength plate 14 twice in a forward way and a backward way, and the return beam is reflected by the polarization beam splitter 14. The return beam reflected by the polarization beam splitter 14 is sensed on a light sensing surface of the photo detector 20 via a condensing lens 18 and a cylindrical lens 19.

The light sensing surface of the photo detector 20 includes, for example, four division light sensing surfaces, and can obtain a focus error signal by astigmatism.

Each light sensing surfaces of the photo detector 20 outputs the current signal depending on the light sensing amount of light and supplies the same to a reflective light calculation circuit 21.

The reflective light calculation circuit 21 converts the current signals from each light sensing surface of four divisions into the voltage signals, performs the calculation processing as an astigmatic method to create a focus error signal FE, and supplies the focus error signal FE to a focus control circuit 22.

The focus control circuit 22 creates a servo driving signal FS of an actuator 29 which movably holds the object lens 26 in a focus direction, based on the focus error signal FE. Moreover, the actuator 29 drives the object lens in a direction approaching and being separated from the inorganic resist master 102 based on the servo driving signal FS, whereby the focus servo is executed.

The inorganic resist master 102 is rotated and driven by the spindle motor 8. The spindle motor 8 is rotated and driven while the rotation speed is controlled by a spindle servo/driver 5. As a result, the inorganic resist master 102 is rotated, for example, by a constant linear speed.

Furthermore, the spindle motor 8 changes the rotational speed depending on speed information instructed to the spindle servo/driver 5 by a controller 2 described below. As a result, the recording speed can be changed.

The slider 7 is driven by a slide driver 6 and moves an overall base including a spindle mechanism with the inorganic resist master 102 mounted thereon. That is, the inorganic resist master 102 rotated by the spindle motor 8 is exposed by the optical system while being moved by the slider 7 in a radial direction, whereby a groove portion (a pit row: a track) formed on the inorganic resist layer 101 is formed in a spiral shape.

A movement position by the slider 7, that is, an exposure position (a disk radial position: a slider radial position) of the inorganic resist master 102 is detected by the sensor 9. Position detection information SS by the sensor 9 is supplied to the controller 2.

The controller 2 is constituted by, for example, a micro computer, and performs the overall control of the master recording portion 1B. For example, by performing a spindle rotation operation control to the spindle servo/driver 5, a control of a movement operation of the slider 7 by the slide driver 6 or the like, the control of the recording position on the inorganic resist master 102 is performed.

Furthermore, in the case of the present example, the speed instruction to the spindle servo/driver 5 is performed, and the setting of the rotation speed (the recording speed) of the inorganic resist master 102 by the spindle motor 8 is performed.

The recording waveform creating portion 3 performs a predetermined recording modulation encoding processing on the input data to obtain a recording modulation code row, and performs the creation of a recording waveform depending on the recording modulation code string.

Furthermore, particularly, in the case of the present embodiment, the recording waveform creating portion 3 performs processing of adjusting a pulse length of the cooling pulse Pc in the recording waveform depending on the instruction from the controller 2. Specifically, the recording waveform is adjusted so that the pulse length of the cooling pulse Pc of the front side is shorter than the normal recording time and a pulse length of the cooling pulse Pc of the back side is longer than the normal recording time, depending on the instruction from the controller 2 corresponding to the high-speed recording time.

Furthermore, as mentioned above, the length of the pit forming waveform portion PP (a waveform portion which includes the recording waveform portion Pr and the cooling pulse Pc placed at both ends thereof) and the land pulse Pin in the recording wavelength are not changed compared to the normal recording time. That is, the shift amounts (absolute values) of the cooling pulse Pc are the same amount in both of the front side and the back side.

In addition, as mentioned above, the pulse length of the cooling pulse Pc is set depending on the pit length. In response, the shift amount of the cooling pulse Pc can also be set depending on the pit length.

The laser driver 4 inputs the recording waveform (the recording driving signal) created by the recording waveform creating portion 3, and drives the laser beam source 11 in the pickup head 10 mentioned above. The laser driver 4 applies a light emitting driving current depending on the recording driving signal to the laser beam source 11.

In addition, the optical intensity monitor signal SM from the monitor detector 17 is also supplied to the laser driver 4. The laser driver 4 is also able to perform the laser light emitting control based on the result in which the optical intensity monitor signal Sm is compared to a standard value.

5. Modified Example

As described above, embodiments according to the present disclosure have been described, but the present disclosure is not limited to the specific examples described above.

For example, the pulse configuration of the recording waveform portion Pr is not limited to one described in FIG. 4, but various configurations can be expected. In the present disclosure, the recording waveform portion Pr may have a recording pulse of sufficiently high power to form at least the pit on the optical disc master.

Furthermore, the present disclosure can suitably be applied to the manufacturing of the optical disc on which information is recorded by the combination the pit/land, and can be applied to the manufacturing of a so-called ROM type of optical disc as well as an optical disc having a portion on which information is recorded by the combination of pit/land even in the case of a write-once type or a rewritable type of optical disc.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
a rotation driving portion that rotates and drives an optical disc master; and
a recording portion that performs an information recording on the optical disc master, by performing a laser beam irradiation on the optical disc master, based on a recording waveform which has a land pulse of a first power, a recording waveform portion having a recording pulse of a second power higher than the first power, and a cooling pulse which has a third power lower than the first power and is inserted between the land pulse and the recording waveform portion, in which, when performing the recording on the optical disc master at a second speed higher than a first speed, compared to a case of performing the recording at the first speed, the recording portion does not change the length of a waveform portion including the recording waveform portion and the cooling pulse placed at both ends of the recording waveform portion and the length of the land pulse, reduces the length of the cooling pulse of a front side of the cooling pulse and expands the length of the cooling pulse of a back side thereof, thereby performing the recording on the optical disc master.

2. The recording apparatus according to claim 1, wherein the recording waveform portion of a pit length other than a shortest pit length includes a plurality of recording pulses.

3. The recording apparatus according to claim 2,
wherein the plurality of recording pulses is connected by a connection pulse by a fourth power that is lower than the first power and is higher than the third power.

4. The recording apparatus according to claim 3,
wherein, when the first speed is single speed and the second speed is equal to or greater than 2.5 times speed, the recording portion sets a reduction/expansion amount of the cooling pulse to ¼ T.

5. A master manufacturing apparatus comprising:
a master creating portion that forms a photosensitive layer, which senses light by a thermal reaction due to a laser beam irradiation, on an upper layer of a substrate to create an optical disc master;
a recording portion that performs an information recording on the optical disc master, by performing the laser beam irradiation on the optical disc master to be rotated and driven, based on a recording waveform which has a land pulse of a first power, a recording waveform portion having a recording pulse of a second power higher than the first power, and a cooling pulse which has a third power lower than the first power and is inserted between the land pulse and the recording waveform portion, in which, when performing the recording on the optical disc master at a second speed higher than a first speed, compared to a case of performing the recording at the first speed, the recording portion does not change the length of a waveform portion including the recording waveform portion and the cooling pulse placed at both ends of the recording waveform portion and the length of the land pulse, reduces the length of the cooling pulse of a front side of the cooling pulse and expands the length of the cooling pulse of a back side thereof, thereby performing the recording on the optical disc master; and
a recorded master creating portion that develops the optical disc master recorded by the recording portion and creates a recorded master formed with a concave and convex pattern.

6. An optical disc recording medium manufacturing method for manufacturing an optical disc recording medium on which information is recorded by a concave and convex pattern comprising:
forming a photosensitive layer, which senses light by a thermal reaction due to a laser beam irradiation, on an upper layer of a substrate to create an optical disc master;
performing an information recording on the optical disc master, by performing a laser beam irradiation on the optical disc master that is rotated and driven, based on a recording waveform which has a land pulse of a first power, a recording waveform portion having a recording pulse of a second power higher than the first power, and a cooling pulse which has a third power lower than the first power and is inserted between the land pulse and the recording waveform portion, wherein, when performing the recording on the optical disc master at a second speed higher than a first speed, compared to a case of performing the recording at the first speed, the length of a waveform portion including the recording waveform portion and the cooling pulse placed at both ends of the recording waveform portion and the length of the land pulse are not changed, and the length of the pulse of a front side of the cooling pulse is reduced and the length of the pulse of a back side thereof is expanded, thereby performing the recording on the optical disc master;
developing the optical disc master recorded by the information recording to create a recorded master formed with a concave and convex pattern on the photosensitive layer;
creating a stamper onto which the concave and convex pattern formed on the photosensitive layer is transferred, based on the recorded master; and
creating the optical disc recording medium by the use of the stamper created by creating the stamper.

* * * * *